United States Patent [19]

Brockmann

[11] Patent Number: 5,657,211

[45] Date of Patent: Aug. 12, 1997

[54] METHOD AND CIRCUIT FOR CONTROLLING THE OUTPUT CHARACTERISTICS OF A SWITCHED-MODE POWER SUPPLY

[75] Inventor: Hans-Jürgen Brockmann, Muurla, Finland

[73] Assignee: Nokia Technology GmbH, Germany

[21] Appl. No.: 651,845

[22] Filed: May 21, 1996

[30] Foreign Application Priority Data

May 26, 1995 [FI] Finland .................. 952571

[51] Int. Cl.$^6$ .................. H02M 3/335
[52] U.S. Cl. .................. 363/16; 363/20
[58] Field of Search .................. 363/16, 20, 40, 363/95, 97, 123, 131

[56] References Cited

U.S. PATENT DOCUMENTS

| 5,331,532 | 7/1994 | Iwai et al. | 363/20 |
| 5,448,466 | 9/1995 | Erckert | 363/16 |
| 5,499,175 | 3/1996 | Noro | 262/16 |

FOREIGN PATENT DOCUMENTS

| 0420997 | 9/1989 | European Pat. Off. . |
| 4130576 | 8/1992 | Germany . |
| 4116434 | 11/1992 | Germany . |
| 4310513 | 6/1994 | Germany . |
| 9509476 | 4/1995 | WIPO . |

OTHER PUBLICATIONS

International Conference on Consumer Electronics IEEE 1991, 5–7 Jun., 1991, Rosemont, IL pp. 58–59, Kieffer et al, "Switch mode power supply, new concept".

Revue Generale De L'Electricité, No. 5, May 1992, Paris, pp. 117–123, "un controleur de'alimentation fly–back avec controle efficace des surcharges".

Eighth Annual Applied Power Electronics Conference and Exposition, 7–11 May 1993 San Diego, California, pp. 527–532, Gass et al.

*Primary Examiner*—Matthew V. Nguyen
*Attorney, Agent, or Firm*—Ware, Fressola, Van Der Sluys & Adolphson

[57] ABSTRACT

The invention relates to a method and a circuit to control the output voltage and current of a switched-mode power supply. In order to restrict the output current, a voltage value proportional to the primary current of a switched-mode power supply is measured and compared to a variable reference voltage $U_{ext}$ the value of which is determined by the total effect of the constant charging current of a capacitor $C_{ext}$ and a discharge circuit operating in step with the secondary diode of the power supply. If the voltage value proportional to the primary current is bigger than said reference voltage, the switching pulses of the primary current switch are shortened. In order to restrict the output voltage, an image voltage is generated for the secondary voltage of the power supply transformer which is filtered and rectified and combined with the aforementioned reference voltage in order to produce pulse-width-modulated switching pulses of the primary current switch.

24 Claims, 11 Drawing Sheets

METHOD AND CIRCUIT FOR CONTROLLING THE OUTPUT CHARACTERISTICS OF A SWITCHED-MODE POWER SUPPLY

TECHNICAL FIELD

The invention relates to a method and circuit to restrict the output current and voltage of a switched-mode power supply.

BACKGROUND OF THE INVENTION

Modern power converter systems often use various switched-mode power supplies (SMPS) to convert a DC voltage (or also an AC voltage, if the coupling includes suitable rectifying means) to a more suitable voltage level and to stabilize the voltage and current fed to the load in conditions where the supply power and the electrical characteristics of the load may vary. In many different applications it is necessary to restrict the output current and voltage of the power supply below a certain maximum value so as not to harm the load and the power supply itself. In addition, it is often advantageous that the output voltage and current can be simultaneously controlled in such a way that there is a relationship between their values. An example of such an application is a charging device for charging batteries. When a discharged battery is coupled to the charging device, its terminal voltage is relatively low at first. During charging, the terminal voltage increases towards a maximum value which depends on the materials and construction of the battery. The temperature of the charging device increases with the terminal voltage of the battery, and the charging current must be limited so as to avoid disadvantageous phenomena, such as excessive warming. Towards the end of the charging process, the current reception capability of the battery fails, whereupon it is advantageous to reduce the output current of the charging device and to limit its output voltage below a certain maximum value so as to avoid losses and other disadvantageous phenomena.

FIG. 1 shows, by way of example, the limit values of the output characteristics of a battery charging device, represented by the area confined by the boundary lines in the figure. The device in question is used to charge a battery, the terminal voltage of which is 10 V when fully charged. When a discharged battery is coupled to the charger, its terminal voltage rises in a few seconds to a certain minimum value, which in this case is about 5 V. The figure shows that the accurately defined current-voltage region, or the narrow "channel" between the boundary lines, starts at five volts, where the output current must be at least 0.76 A and no more than 0.84 A. Below this voltage level the output characteristics of the charger are of little importance as long the charger does not produce a current peak of more than 0.84 A upon switch-on.

During the charging process, the output current of the charger described must be kept substantially constant at about 0.8 amps. The boundary lines confine a tolerance region which represents the allowed ±5% variation range for the current value. It is not practical to specify the current value more accurately than this, because the electrical characteristics of components always vary within certain tolerances. The terminal voltage of the battery charged increases until it begins to near the nominal maximum value of 10.0 V. At this point, the voltage limiter of the charger starts limiting its output voltage to prevent it from exceeding the upper limit value. The voltage limiter is designed for 10.0 volts, but there is a ±5% variation range about the nominal value just as in the case of current limiting. When the charging process ends, the output current of the charger is substantially zero and its output voltage at least 9.5 V and not more than 10.5 V. After this, it is known to continue charging using a so-called trickle charge function, where a switch on the secondary side, i.e. on the load side of the charger switches the charging repeatedly on and off. Also in this case the limiter functions of the charger must keep the output current and voltage within allowed limits.

A switched-mode power supply which can be used to realize the charging function described above typically comprises a transformer which divides the power supply into a primary part and a secondary part. Input voltage is connected to the input terminals in the primary. Typically the power supply includes a switching element, advantageously a MOSFET or bipolar transistor which chops the input voltage into pulses that supply current to the primary winding of the transformer. Variation of the primary voltage and current stores magnetic energy in the magnetic field of the transformer. With suitable polarity in the primary and secondary windings of the transformer and using rectifier diodes the stored energy is transferred to the secondary winding and therefrom to the secondary part of the switched-mode power supply, where it produces an output voltage at the power supply output terminals. There are several known circuit topologies, or ways to arrange the components in the power supply apparatus described in relation to each other in order to achieve the desired operation. The most popular of these are the buck, boost and flyback topologies.

The traditional approach in implementing stabilization of output characteristics in a switched-mode power supply like the one described here has been to measure the output current and voltage in the secondary and take the measuring data to the circuit element in the primary that determines the duty cycle, or the ratio of the ON and OFF times of the switching transistor used to chop the primary voltage. The longer the ON time in proportion to the OFF time, the greater the amount of energy stored in the transformer's magnetic field dining an ON-OFF cycle, and the greater the amount of energy transferred through the secondary winding to the secondary of the circuit and further to the load. It depends on the construction of the secondary part and on the electrical characteristics of the load, whether it is the output voltage, the output current or both that increases. Correspondingly, decreasing the pulse ratio, or the proportion of the ON time, reduces the amount of energy transferred and hence the output voltage or the output current or both.

In a switched-mode power supply like the one described the power and voltages may be relatively high. As regards electrical safety, it is often preferable that there is no galvanic contact between the primary and the secondary. If it is desired to transfer the current or voltage information measured in the secondary to stabilize the output characteristics to the primary side, it must be conveyed through an opto-isolator or a corresponding component which realizes galvanic isolation. The price and limited reliability and life of the opto-isolator are disadvantageous factors from the manufacturing standpoint.

The development of switched-mode power supplies has been towards concentrating the control and limiting functions in the primary part only. The idea is based on the fact that the output characteristics can be determined on the basis of certain parameters of the primary part. It is known to add to a transformer like the one described a third, or additional, winding to generate an image of the voltage waveform induced in the secondary winding during one cycle. It is also known to measure the primary current by connecting a small current measuring resistor in series with the switching element and measuring the voltage loss across said resistor. It is beneficial to concentrate the control and limiting functions in the primary because most of the necessary measuring and adjusting connections can be integrated in one IC which also advantageously contains means to produce the switching element ON and OFF signals. The switching element can also be integrated in the same circuit. The disadvantages of opto-isolators are thus avoided.

FIG. 2 illustrates a known method to limit the output current $I_{OUT}$ in a flyback-type switched-mode power supply. Transformer T1 includes a primary winding 11, a secondary winding 12 and an additional winding 13. The primary side includes a MOSFET transistor Q1 used for switching the primary current, a control circuit F1 to control the gate voltage of said transistor, a current measuring resistor $R_s$, a differential amplifier A1, a constant current supply $I_c$, a so-called "external" capacitor $C_{ext}$, a current path to discharge said capacitor including a resistor $R_c$ and a switch S1, and a so-called additional circuit 10. The word "external" is used throughout this text simply to qualify the capacitor $C_{ext}$ and it does not necessarily mean that said capacitor is physically located apart from the rest of the circuit. The additional circuit 10 connected to the additional winding 13 is a detector the task of which is to detect the demagnetization of transformer T1, or the moment at which the energy stored in the magnetic field during one ON cycle of transistor Q1 is completely transferred to the secondary of the power supply. The secondary of the power supply according to FIG. 2 comprises a diode D1, a relatively high-capacity capacitor C1 to stabilize output voltage variation in one cycle, and a relatively large shunt resistor $R_a$ the purpose of which is to serve as a minimum load and to provide a discharge path for the charge stored in capacitor C1 upon switch-off.

The circuit depicted in FIG. 2 operates as follows: At the beginning of a cycle, the control circuit F1 switches the MOSFET transistor Q1 ON, i.e. into conductive state. An increasing primary current $I_p$ starts to flow through the primary winding 11, MOSFET transistor Q1 and the current measuring resistor $R_s$. Affected by the inductance of winding 11, the primary current $I_p$ increases linearly. The polarities of windings 11 and 12 and diode D1 are such that the magnetic field produced by the primary current $I_p$ tries to induce in the secondary winding 12 a voltage in relation to which the diode D1 is reverse-biased. The diode prevents the flow of current in the secondary circuit, whereby energy is stored in the strengthening magnetic field. When the MOSFET transistor is switched OFF, the sign of the time derivative of the magnetic field is reversed and a current is induced in the secondary winding in relation to which the diode D1 is forward-biased. Part of the secondary current $I_s$ produced is taken to the load as output current $I_{OUT}$ and part of it charges the capacitor C1, which has maintained the output current $I_{OUT}$ by partly discharging while the secondary current $I_s$ was not flowing. When the energy in the magnetic field has been completely discharged, the secondary current $I_s$ stops flowing and the additional circuit 10, which measures the small current $I_a$ induced in the additional winding, detects the situation and informs the control circuit F1. The signal provided by the additional circuit affects the pulse ratio: the less time was used to discharge the magnetic energy, the longer the ON time in proportion to the OFF time that is needed in the next cycle and vice versa.

During the ON cycle of the MOSFET transistor Q1 the primary current $I_p$ flows through a current measuring resistor $R_s$, as described above. A differential amplifier A1 compares the existing voltage loss of resistor $R_s$ to a reference voltage $U_{ext}$ between the terminals of the external capacitor $C_{ext}$. If the existing voltage loss of resistor $R_s$ becomes greater than voltage $U_{ext}$, the differential amplifier A1 informs control circuit Fi that the primary current has reached its peak value, whereupon the MOSFET transistor Q1 is immediately switched OFF.

In addition to controlling the gate voltage of the MOSFET transistor Q1 the control circuit F1 controls the position of switch S1. Switch S1 should always be ON, i.e. conductive, when diode D1 is conductive, and correspondingly OFF when diode D1 is non-conductive. This is to keep the voltage $U_{ext}$ between the terminals of capacitor $C_{ext}$ correct by providing a current path, which comprises a switch S1 and a series resistor $R_c$, discharging the capacitor when switch S1 is ON. The control circuit F1 sets switch S1 ON when switching the MOSFET transistor Q1 OFF, and OFF when the additional circuit 10 informs that the transformer T1 has been demagnetized.

By using the demagnetizing information to control the pulse ratio and by preventing the primary current $I_p$ from increasing too much the primary part of the switched-mode power supply shown in FIG. 2 controls the output current $I_{OUT}$ of the device. When the output voltage $U_{OUT}$ increases, e.g. when a battery connected to the charger is being charged, the demagnetization time of transformer TI and the conduction time of diode D1 become shorter. The power supply meets the growing demand for output current by increasing the pulse ratio on the basis that also the ON time of switch S1 is shortened, whereupon the voltage $U_{ext}$ between the terminals of capacitor $C_{ext}$ is increased. In the opposite case, slow demagnetization or very high primary current mean excessive output current, with switch S1 in conductive state for a long time during the cycle, which decreases the voltage $U_{ext}$ between the terminals of capacitor $C_{ext}$, which in turn decreases the pulse ratio. As regards e.g. a battery charger like the one described above, the disadvantage of this known arrangement is that it includes no output voltage limiter.

FIG. 3a shows a known circuit used for estimating the output voltage of a flyback type switched-mode power supply. The circuit is intended to be used as part of the primary of the power supply, but for reasons of clarity the rest of the primary, with the exception of primary winding 11, are not shown. The voltage regulating circuit (as it will be called hereinafter) according to FIG. 3a comprises a rectifying diode D2, series resistor R2, resistors R3 and R4 for voltage division, capacitor C2 for stabilizing voltage variations at point A during one cycle, and as a load, a constant resistance $R_a$, which could be replaced by a constant current load the current $I_a$ of which would be advantageously about 10 mA. The voltage regulating circuit also includes a voltage comparison stage which comprises a differential amplifier A2.

The voltage regulating circuit according to FIG. 3a is a kind of a mirror image of the secondary of the switched-mode power supply and indeed it is designed to produce a so-called image voltage $U_a$ at point A in the same way that the secondary produces an output voltage $U_{OUT}$ at the output terminals of the switched-mode power supply. The image voltage $U_a$ is measured via a voltage divider comprising resistors R3 and R4 and compared to an accurate reference voltage $U_{ref}$ by means of a differential amplifier A2. The output of the differential amplifier A2 is used to control the primary current switch (not shown) through a pulse width modulator and a control circuit (not shown). The component values are selected such that the power consumption in the voltage regulating circuit is as small as possible. Unfortunately this goal conflicts with the objective that the image voltage $U_a$ should be a perfect image of the controlled output voltage $U_{OUT}$.

The fundamental flaw in the operation of the circuit is related to the magnetic properties of transformer T1. In a typical switched-mode power supply transformer that includes an additional winding, such as transformer T1 in FIG. 3a, there has to be an insulating layer between the primary 11 and secondary 12 windings. However, the additional winding 13 can be wound directly over or under the primary winding 11 or even interleaved with it. Therefore, the coupling coefficient between the primary winding 11 and the additional winding 13 is nearer to 1 than the coupling coefficient between the primary winding 11 and the secondary winding 12. In the case of the transformer shown in FIG. 3a, typical coupling coefficients can be about 0.99 between the primary and additional windings and about 0.98 between the primary and secondary windings. The difference of the coupling coefficients means that when the current through the primary winding 11 is shut off, the energy stored by its leak inductance cannot be transferred to the secondary winding 12, but part of it can be transferred to the additional winding 13, which results in a voltage peak across the additional winding. The height of the peak depends on the mount of energy stored in the leak inductance of the primary winding. If the output power, or output current, of the switched-mode power supply is high, a lot of energy is transferred in one cycle and, correspondingly, more energy is lost in the leak inductances than if the output power were low. A great amount of energy stored in the leak inductance means a high voltage peak across the additional winding 13. Capacitor C2 partly rounds off the effect of the voltage peak, but in any case it leads to a nearly linear dependence between the image voltage $U_a$ and the output voltage, as seen in FIG. 4.

A solution to the problem described above would be to add an insulating layer between the primary 11 and additional 13 windings in transformer T1, whereby the coupling coefficient between them would be equal to that between the primary and secondary windings. A sandwich type transformer could also be used. However, the transformer is already the most expensive single component in a switched-mode power supply, so it is not preferable to make its construction more complex.

Another solution is to eliminate the voltage peak using any arrangement known to one skilled in the art. One such arrangement is shown in FIG. 3b where a low-pass type coupling consisting of a resistor R5 and a capacitor C3 is added to the arrangement shown in FIG. 3a. A rectifying diode D3 and a capacitor C4 are also added to the circuit. Resistors R3 and R4 comprise a voltage dividing coupling connected in series with diode D3, used for taking a voltage signal to the differential amplifier A2, said voltage signal being proportional to voltage $U_b$ at point B, i.e. to the rectification result of the low-pass filtered image voltage. Voltage $U_b$ is a better representation of the switched-mode power supply output voltage $U_{OUT}$ as a function of the output current $I_{OUT}$, as can be seen from the curves in FIG. 4, but it still depends, and non-linearly depends, on the output era-rent $I_{OUT}$.

The curves in FIG. 4 are the result of a laboratory measurement wherein the output voltage $U_{OUT}$ of the switched-mode power supply was kept constant and image voltage alternatives $U_a$ and $U_b$ were studied as the function of the output current $I_{OUT}$. In a real switched-mode power supply using a voltage regulating circuit according to FIG. 3a or 3b, a differential amplifier A2 compares voltage $U_a$ or $U_b$ to an accurate and constant reference voltage $U_{ref}$, so it is implied that the image voltage $U_a$ or $U_b$, whichever is used, reflects the output voltage $U_{OUT}$ realistically, being directly proportional to it and wholly independent of the output current $I_{OUT}$. Since this is not the case, the output voltage $U_{OUT}$ of the switched-mode power supply becomes too high with a small output current $I_{OUT}$.

Several other ways to improve the output characteristics of a switched-mode power supply are known. A known arrangement includes a sampling circuit, which does not measure the shape of the whole voltage pulse induced in the additional winding, but takes a narrow sample from it, advantageously near the trailing edge of the pulse. The effect of the voltage peak mentioned above is at its smallest near the trailing edge of the pulse. The voltage sample is used to generate an image voltage, which is used in the same manner as image voltages $U_a$ and $U_b$ described above. The sampling circuit naturally adds to the complexity, manufacturing costs and power consumption of the arrangement. It is further known a solution in which a current integrator used for measuring the output voltage is added to the current limiting arrangement according to FIG. 2. The solutions described have not been able to correct the non-linear dependence between the output voltage and output current in a switched-mode power supply, which typically manifests itself in a sharp increase in the output voltage when the output current is small.

It is also known a method called burst mode control, where an image voltage (above, $U_a$ and $U_b$) is measured and compared to a reference value. If the measured value is greater than the reference value indicating the allowed maximum, a Schmitt trigger circuit grounds the gate of the MOSFET transistor functioning as a primary current switch, i.e. switches the transistor OFF for a predetermined period of time the duration of which is determined by the component values. When the forced grounding of the transistor gate ceases, the cycle starts over again. The problem with this arrangement is that when the forced grounding of the switching transistor gate is ended, the switched-mode power supply immediately starts operating at a high power, pumping a great amount of magnetic energy into the transformer and causing sharp voltage peaks in the voltage across the additional winding. This has the same effect as the fact that the image voltages $U_a$ and $U_b$ mentioned above depend on the output current of the switched-mode power supply: the open circuit voltage, or the output voltage of the device increases when the output current is small.

SUMMARY OF THE INVENTION

The object of the invention is to provide a method and a circuit for controlling the output voltage and output current of a switched-mode power supply with couplings in its primary part partly avoiding and partly reducing the aforementioned disadvantages related to the prior art solutions.

The object of the invention is achieved by combining to the operation of a current measuring and regulating circuit a simultaneous operation of a voltage measuring and regulating circuit so that a compensating voltage is generated which compensates for the change that appears as a function of the output current of the switched-mode power supply in the operation of the voltage measuring and regulating circuit. Also, to achieve the object of the invention, a compensating coupling is provided from the voltage measuring and regulating circuit to the current measuring and regulating circuit to compensate for the variation of the reference voltage used in the current regulation as a function of the output current of the switched-mode power supply.

The method according to the invention, wherein a first reference voltage and a first voltage signal and switching pulses to switch the primary current switching element are generated on the primary side of a switched-mode power supply, is characterized in that also on the primary side a combination is produced of said first voltage signal and said first reference voltage, and said switching pulses for switching the primary current switching element are generated on the basis of said combination.

The circuit according to the invention, which includes a control circuit on the primary side to generate said switching pulses, is characterized in that it further includes on the primary side means for producing a combination of said first reference voltage and first voltage signal and for directing said combination to said control circuit to generate said switching pulses.

During the development work that led to the invention it was discovered that by combining the operation of a prior art current regulating circuit with the operation of a prior art voltage regulating circuit it is possible, with suitable couplings, to produce a voltage the behaviour of which as a function of the output current of the switched-mode power supply is particularly advantageous and which therefore may be used to compensate for a similar but opposite signed change in the voltage regulating circuit. Said voltage is produced between the terminals of an "external" capacitor belonging to a prior art current regulating circuit and its generation and value as a function of the output current of the switched-mode power supply will be discussed later.

BRIEF DESCRIPTION OF THE DRAWINGS

Below, the invention is described in more detail using certain embodiments as illustrative examples and referring to the accompanying drawing, in which.

BEST MODE FOR CARRYING OUT THE INVENTION

In all figures, like parts are denoted by like reference numbers.

A battery charging device will be described next in order to illustrate the ways in which the invention can be applied. However, the invention is not limited to the embodiments described, but it is clear to one skilled in the art that it can be used in all applications in which it is desired to limit the output voltage and output current of a switched-mode power supply by means of a circuit arrangement in the primary part.

The method and circuit according to the invention employ a known pulse width modulator controller designed for switched-mode power supplies; said controller will hereonafter be called a PWM circuit and as far as the structure of the invention is concerned, said circuit is thought to belong to the controller circuit of the power field-effect transistor serving as a primary current switch. A suitable PWM circuit is SGS-Thomson's LM3524 but other corresponding PWM circuits known to one skilled in the art can be used as well. The same functions can also be implemented using separate components. Parts and functions in the PWM circuit that are significant from the point of view of the invention are a differential amplifier for comparing a certain measured voltage to a certain reference voltage, a pulse generator, which on the basis of an output from said differential amplifier produces a pulse-width-modulated switching pulse sequence to control the primary current switch in the switched-mode power supply, and a clock pulse generator, which produces at a predetermined frequency the timing pulses needed for controlling the operation of the whole circuit arrangement, said predetermined frequency being advantageously 43 kHz, approximately, in the circuit and method according to the invention.

The method and circuit according to the invention employ a switched-mode power supply transformer which advantageously comprises three windings. A suitable transformer is e.g. the Salcomp FM3750, but other transformers can be used if the component values in the circuit arrangement are slightly changed.

Figures 1, 7A:
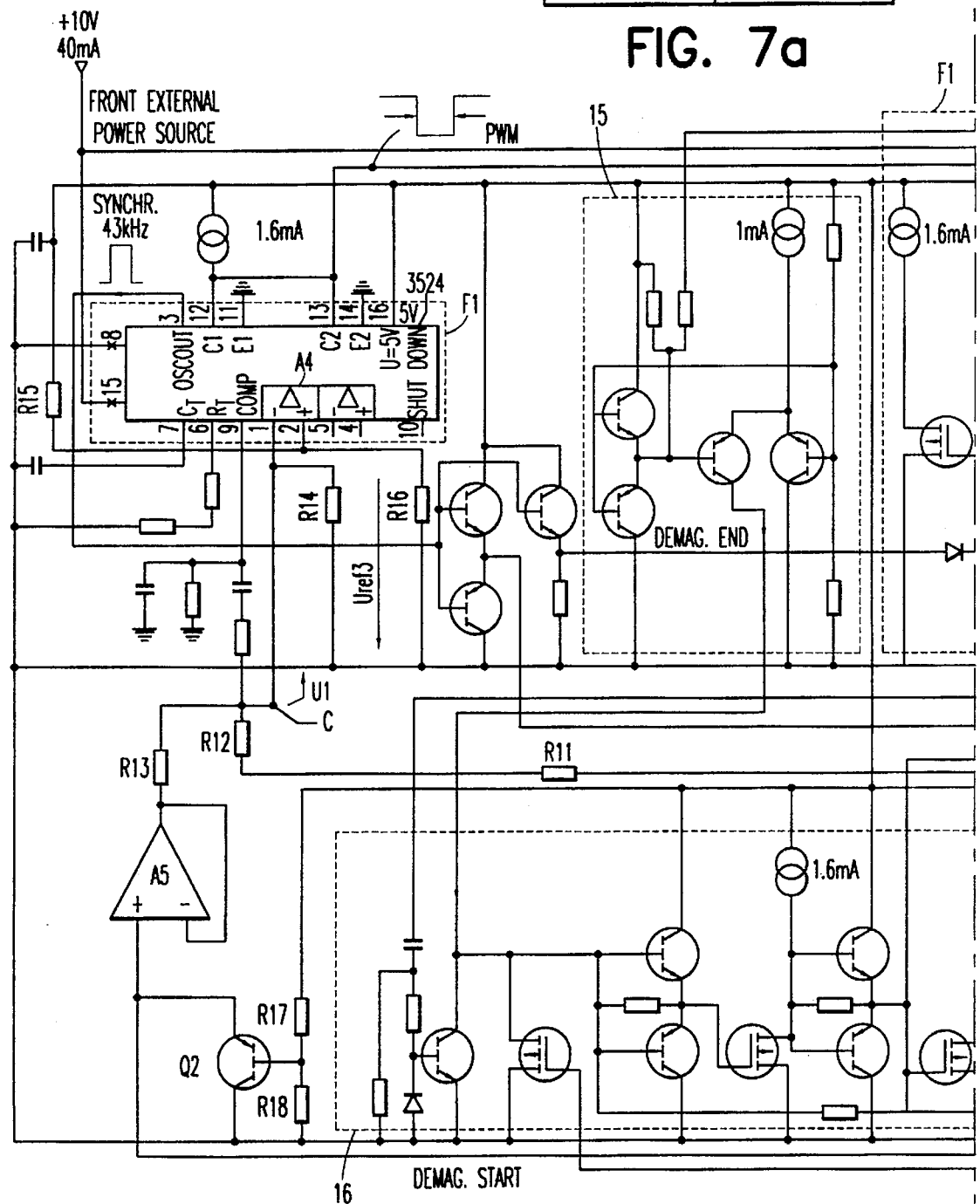
FIG. 7a is a circuit diagram of an embodiment of the invention.

FIG. 7a shows a circuit diagram illustrating an embodiment of the circuit according to the invention. The circuit according to the invention uses in a known manner a power FET Q1, hereafter called a FET, to interrupt the primary voltage and current in a switched-mode power supply. The primary current $I_p$ chopped by said FET Q1 flows through the primary winding 11 in transformer T1. A relatively low-resistance current measuring resistor $R_s$ is connected in series with said FET Q1 to direct said primary current $I_p$ also through said current measuring resistor $R_s$. A tuning resistor R6 can be connected in parallel with said current measuring resistor as in the embodiment illustrated by FIG. 7a, or other known methods can be used for accurately selecting a value for the current measuring resistance. The purpose of said current measuring resistor $R_s$ is to determine the intensity of the primary current $I_p$ by measuring the voltage loss across said current measuring resistor. For the measurement, a connection is provided to a differential amplifier A1 at a point between the FET Q1 and the current measuring resistor $R_s$. Advantageously the connection is made via a voltage dividing coupling consisting of resistors R7 to R10 so that the first end (R7) of said voltage dividing coupling is connected between said FET Q1 and said current measuring resistor $R_s$ and the second end (R10) to the input voltage $U_s$ of the switched-mode power supply. Connection from said voltage dividing coupling R7–R10 to the positive input of said differential amplifier A1 is advantageously made at a point between the first R7 and the second R8 resistor of the voltage dividing coupling. The purpose of the voltage dividing coupling R7–R10 is to compensate for disturbances occurring in the measurement, caused by variations in said input voltage $U_s$.

The negative input of said differential amplifier A1 is connected to a first reference voltage $U_{ext}$ which is the voltage between the terminals of an external capacitor $C_{ext}$. The purpose of said differential amplifier A1 is to compare a measured voltage proportional to the intensity of the primary current $I_p$ to said first reference voltage. The output of the differential amplifier A1 is connected to a circuit F1 controlling the gate voltage of said FET Q1. If the voltage across the current measuring resistor $R_s$ measured by the differential amplifier A1 is greater than said first reference voltage $U_{ext}$, the differential amplifier A1 sends to circuit F1 a signal on the basis of which circuit F1 switches FET Q1 OFF.

According to the embodiment shown in FIG. 7a, the circuit according to the invention can advantageously include a second differential amplifier A3, and the same voltage proportional to the intensity of the primary current which was connected to the positive input of the differential amplifier A1 is connected to the positive input of said second differential amplifier A3. A second reference voltage $U_{ref2}$, which in the embodiment of FIG. 7a is generated with a voltage divider comprising resistors R24 and R25 at a point between +5 V and the ground potential, is connected to the negative input of said second differential amplifier the purpose of which is to compare said voltage proportional to the intensity of the primary current to said second reference voltage $U_{ref2}$. If the voltage across the current measuring resistor $R_s$ measured by differential amplifier A3 is greater than said second reference voltage $U_{ref2}$, differential amplifier A3 sends to circuit F1 a signal on the basis of which circuit F1 switches FET Q1 OFF. The purpose of this function is to improve the reliability of the circuit in a situation where the first reference voltage $U_{ext}$ for some reason exceeds the fixed second reference voltage $U_{ref2}$.

Figure 2:
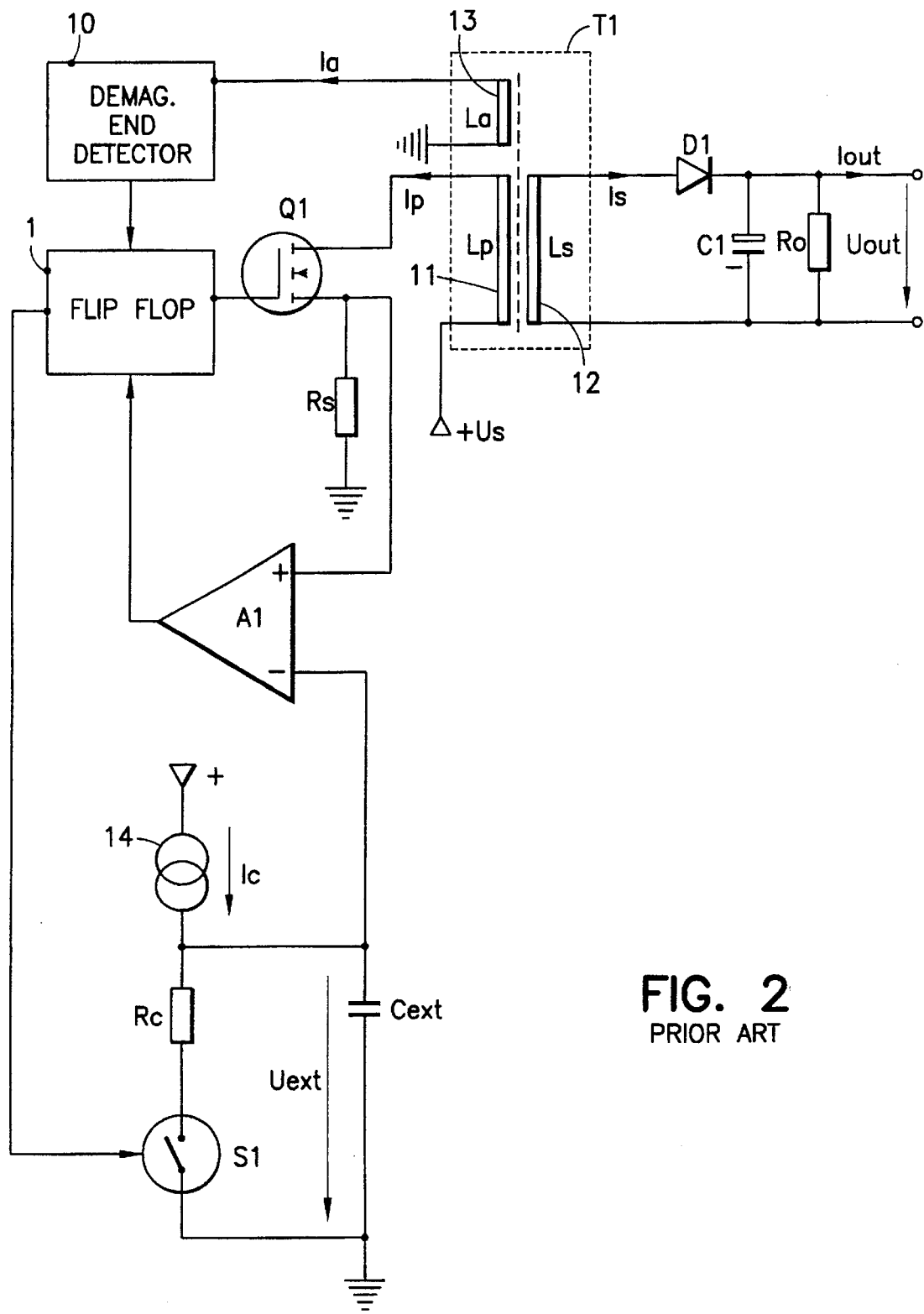
FIG. 2 is a circuit diagram of a known current limiting circuit of a switched-mode power supply.

Next, we will discuss the value of said first reference voltage $U_{ref}$ and how it is determined. Said voltage is the voltage between the terminals of a so-called external capacitor $C_{ext}$ and to affect the voltage the circuit according to the invention includes a controlled current path S1, $R_c$, which can be used to produce a discharging coupling between the terminals of said capacitor by making switch S1 conductive. The circuit according to the invention also includes a constant current supply 14 for continuously charging the external capacitor $C_{ext}$ with a constant current $I_c$. From the point of view of the invention, it is essential that voltage $U_{ext}$ is determined as a function of the output current $I_{OUT}$ of the switched-mode power supply, and it can be theoretically calculated by assuming that the conduction time $t_S$ of switch S1 is linearly dependent on the conduction time $t_D$ of diode D1 in the secondary of the switched-mode power supply. Above in the description of the prior art, where a reference was made to FIG. 2, a similar connection was made between the conduction times $t_S$ and $t_D$, where it was however assumed that as a result of the operation of an additional circuit 10 and controller circuit F1 the times $t_S$ and $t_D$ are the same. The linear dependence proposed here is a more realistic assumption.

Figure 5:
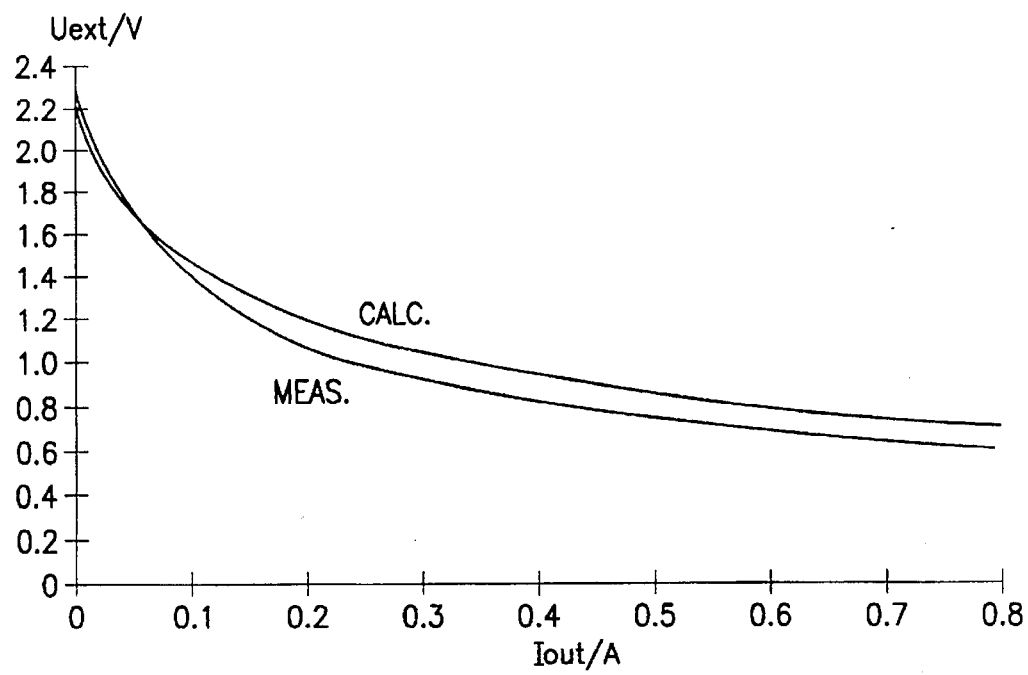

According to a known induction law $$U_{out} + U_D = L_S \frac{\hat{I}_S}{t_D}, \tag{1}$$

where $U_{OUT}$ is the output voltage of a switched-mode power supply, $U_D$ is the voltage loss across diode D1, $L_S$ is the inductance of the secondary winding, $\hat{I}_S$ is the peak value of the secondary current, and $t_D$ is the conduction time of diode D1. Equation 1 is accurately true only if the constant current load $I_a$ is zero. When calculating the connection between the peak current $\hat{I}_S$ and the output current $I_{OUT}$ of the switched-mode power supply, an approximation can be made where the effect of a constant current load connected to the additional winding 13 is taken into account by adding to the output current term $I_{OUT}$ a constant term $$\frac{n_a}{n_S} I_a = \frac{34}{17} \cdot 10\text{mA} = 20\text{mA}, \tag{2}$$

where $n_a$ and $n_s$ are the numbers of turns of the additional and secondary windings and $I_a$ is the intensity of the constant current load, 10 mA in the embodiment of FIG. 7a. Now, the connection between the peak current $\hat{I}_S$ and the output current $I_{OUT}$ of the switched-mode power supply is given by $$\frac{1}{2} \hat{I}_S t_D = \left( I_{OUT} + \frac{n_a}{n_S} I_a + \frac{U_{OUT}}{R_0} \right) T, \tag{3}$$

where $R_o$ is the resistance of an output resistor (shunt resistor) $R_o$ and T is the cycle time of the switched-mode power supply, or the inverse of the operating frequency, here assumed to be a constant. Also $U_{OUT}$ and $R_o$ are substantially constant, so in equation 2, time $t_D$ depends only on the current $I_{OUT}$. By solving for the peak current $\hat{I}_S$ we get $$\hat{I}_S = 2 \left( I_{out} + \frac{n_a}{n_S} I_a + \frac{U_{out}}{R_0} \right) \frac{T}{t_D}, \tag{4}$$

and by inserting this in equation 1 we get, after a little manipulation, $$t_D = \sqrt{\frac{2L_S \left( I_{out} + \frac{n_a}{n_S} I_a + \frac{U_{out}}{R_0} \right) T}{U_{out} + U_D}} \tag{5}$$

for the conduction time of diode D1. For the voltage between the terminals of the external capacitor we get $$U_{ext} = R_C I_C \frac{T}{t_S}, \tag{6}$$

where $R_C$ and $I_C$ are the discharge current path resistance and charging current according to FIG. 7a and $t_S$ is the conduction time of switch S1. Above it was mentioned that a linear dependence is assumed between the conduction times $t_S$ and $t_D$, or that $$t_s = \kappa t_D + \tau, \tag{7}$$

where $\kappa$ and $\tau$ are constants. Combining the results of equations 5, 6 and 7, we get $$U_{ext} = \frac{I_C R_C}{\kappa \sqrt{\frac{2L_S \left( I_{out} + \frac{n_a}{n_S} I_a + \frac{U_{out}}{R_0} \right)}{(U_{out} + U_D)T}} + \frac{\tau}{T}} \quad (8)$$

for the voltage $U_{ext}$ between the terminals of the external capacitor $C_{ext}$. A laboratory measurement has been performed to determine the values of constants $\kappa$ and $\tau$, wherein the constant values were determined as $$\kappa = 0.9900 \char`\^ \tau = 1.300 \mu \text{ sec} \quad (9)$$

at a probability of more than 99% in a series of more than 30 measurements. The behaviour of voltage $U_{ext}$ as a function of the output current $I_{OUT}$ of the switched-mode power supply, calculated on the basis of equation 8, is shown in FIG. 5 "calc."). For the sake of comparison, the figure also shows a measured voltage $U_{ext}$ ("meas.") for a real circuit according to the invention.

To control switch S1 in the manner described above the circuit according to the invention includes means to detect the moments of time at which the demagnetization of transformer T1 begins and ends during one cycle. Below it will be described the structure and operation of these means in the embodiment illustrated by FIG. 7a.

Demagnetization is started at the moment when FET Q1 is switched OFF. Information about this is brought to a demagnetization time simulation block 16 simply with a connection from the inverse of the gate voltage of FET Q1 generated in a control circuit F1. Detection of the end of demagnetization is more difficult, and therefore an additional winding 13 in the transformer in the embodiment of FIG. 7a produces a voltage the shape of which corresponds to the shape of the voltage of the secondary winding 12. When energy stored during a cycle in the magnetic field of the transformer has been discharged, diode D1 in the secondary stops conducting, which results in a drop in the induction voltage in all three windings 11, 12 and 13. Energy stored in the capacitances of the windings and in the internal capacitances of FET Q1 is discharged, which results in damped voltage oscillation in the windings. The first voltage swing is detected in the additional winding 13 as negative and it is taken to a detector, which in the embodiment of FIG. 7a is a differential amplifier coupling 15. On the basis of the detection it generates a signal which is taken to the demagnetization time simulation block 16. On the basis of the start and end signals the demagnetization time simulation block generates the timing pulses that are needed for controlling switch S1 as described above. Then said first reference voltage $U_{ext}$ is generated across capacitor $C_{ext}$.

Figures 2, 7A:
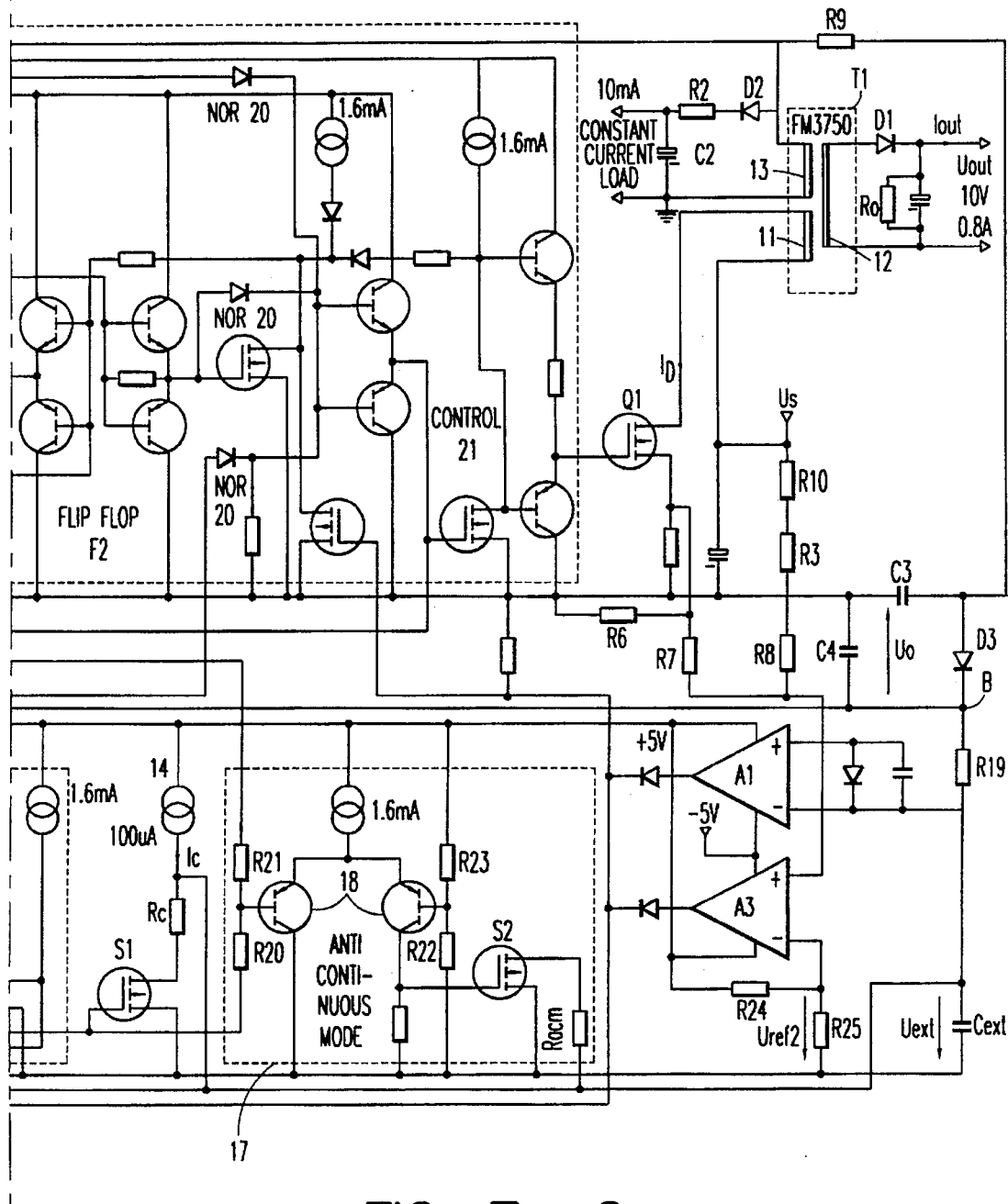
Figure 7B:
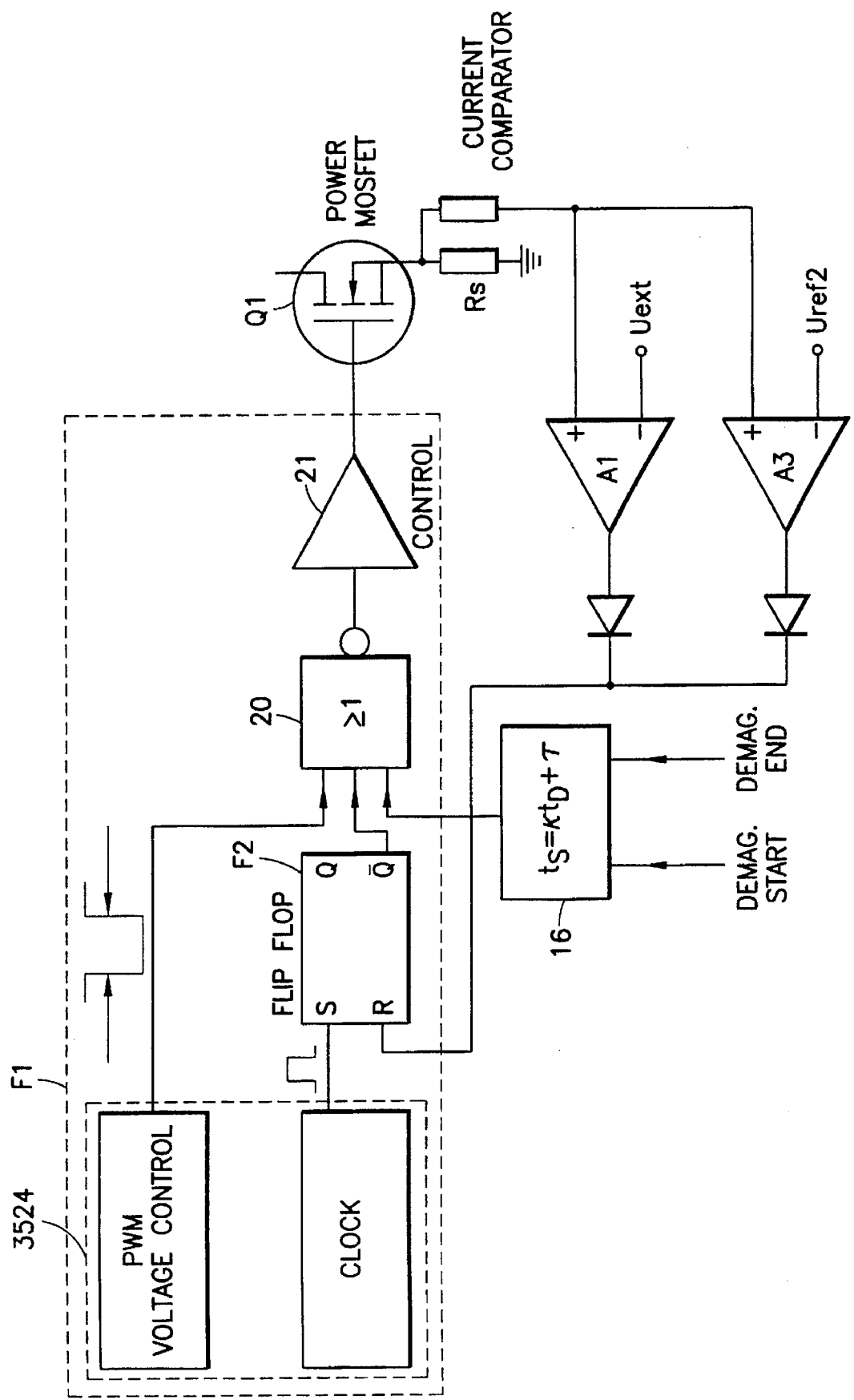
FIG. 7b is a block diagram of part of FIG. 7a, FIG. 8 is a block diagram of the whole embodiment shown in FIG. 7a, FIG. 9 is an activity graph illustrating the flow of signals and information and the sequence of activities in the switched-mode power supply according to the invention.

FIG. 7b shows a partial block diagram of the embodiment of FIG. 7a, illustrating the generation of FET Q1 switching pulses in control circuit F1. The element that decides the length of the switching pulse is a logic NOR gate 20, shown in the middle of FIG. 7b, included in control circuit F1 in the embodiment of FIG. 7a. Its output is at logic level 0 if at least one of its three inputs is at logic level 1. The inputs are a pulse-width-modulated switching pulse train from a PWM circuit 3524, an inverted output Q from a flip-flop circuit F2 and an output from the demagnetization time simulation circuit 16, wherein logic level 1 corresponds to conduction time $t_S$ of switch S1 (not shown in FIG. 7b). At the beginning of the cycle the rising edge of a clock pulse sets the value of the inverted output $\overline{Q}$ of the flip-flop circuit F2 to 0 and at the same time a 0-level pulse is started in the pulse-width-modulated switching pulse train. If the switched-mode power supply is operating normally and not transiting to continuous mode operation, switch S1 is non-conductive at the beginning of the cycle and, so, the level is 0 also at the output of the demagnetization time simulation circuit 16. As a result of the logic NOR function, gate 20 switches FET Q1 into conductive state through control circuit 21. When the pulse from PWM circuit 3524 rises to level 1 or when one of the current measuring amplifiers A1, A3 detects that primary current has reached its peak value and resets the flip-flop circuit F2, the logic NOR gate 20 receives one 1-level input and switches FET Q1 into non-conductive state through control circuit 21. So, the event that occurs first ends the conduction of FET Q1.

It is possible, particularly when the output voltage is relatively low, that a flyback type switched-mode power supply starts to operate in a so-called continuous mode. This can happen, for example, as a result of a short-circuit between output terminals or if a wholly discharged battery is connected to the charging device. Continuous mode operation means that the transformer T1 is not completely demagnetized when FET Q1 is switched back ON. In prior art systems, this may lead to very high primary and secondary currents and thus damage the components or conductors. Furthermore, in continuous mode operation, the current limiting algorithm described above will not function properly. By bringing an output from the demagnetization, time simulation circuit 16, in which logic level 1 corresponds to conduction time $t_S$ of switch S1, as an input to NOR gate 20 in the manner described above, it is possible to limit the continuous mode output current, but in order for the circuit according to the invention to completely prevent the switched-mode power supply from entering the continuous mode, it includes an anti-continuous mode block 17, hereinafter referred to as the ACM block. Next it will be described the structure and operation of this block in the embodiment illustrated by FIGS. 7a and 8.

Figure 8A:
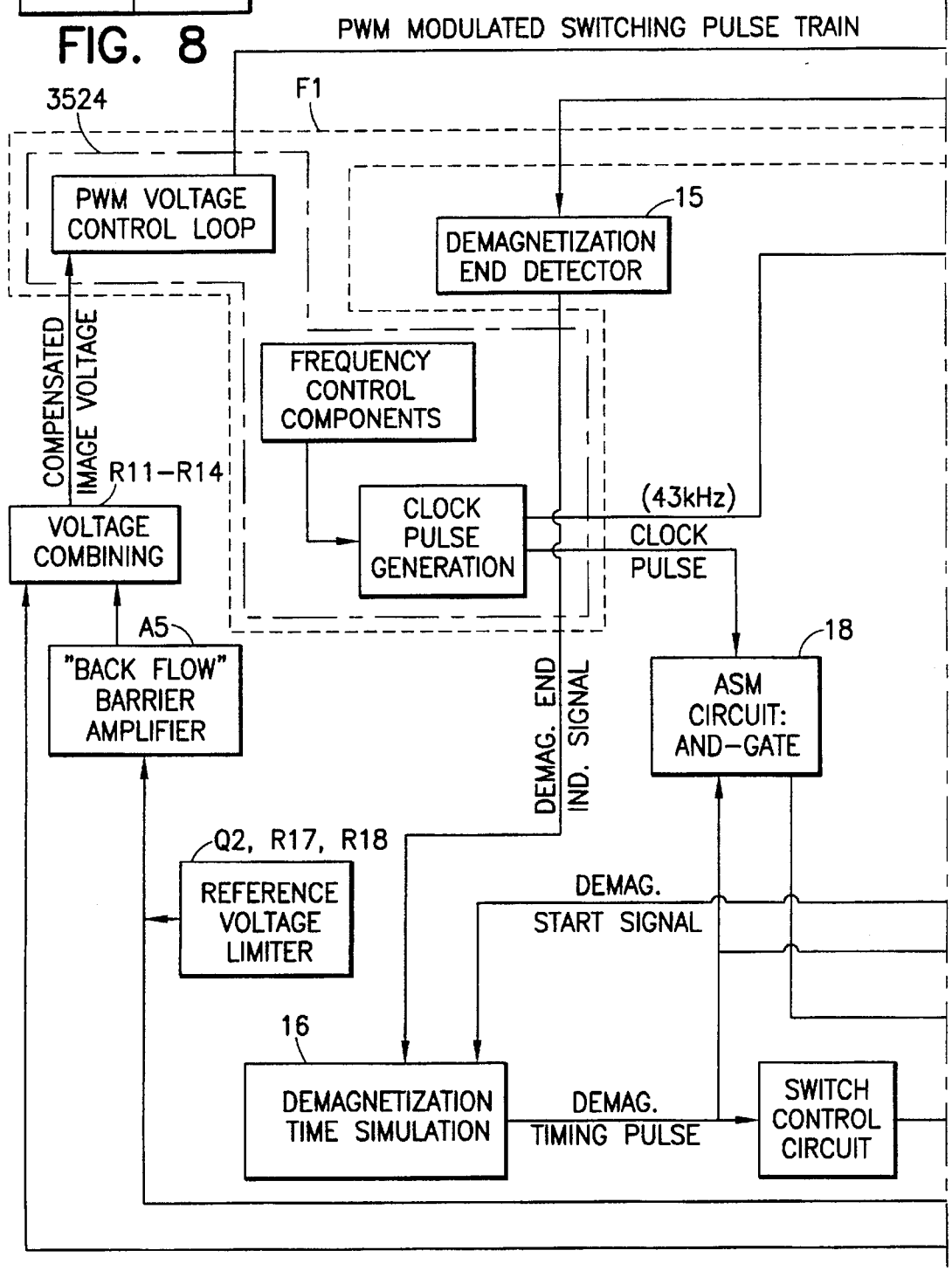
Figure 8B:
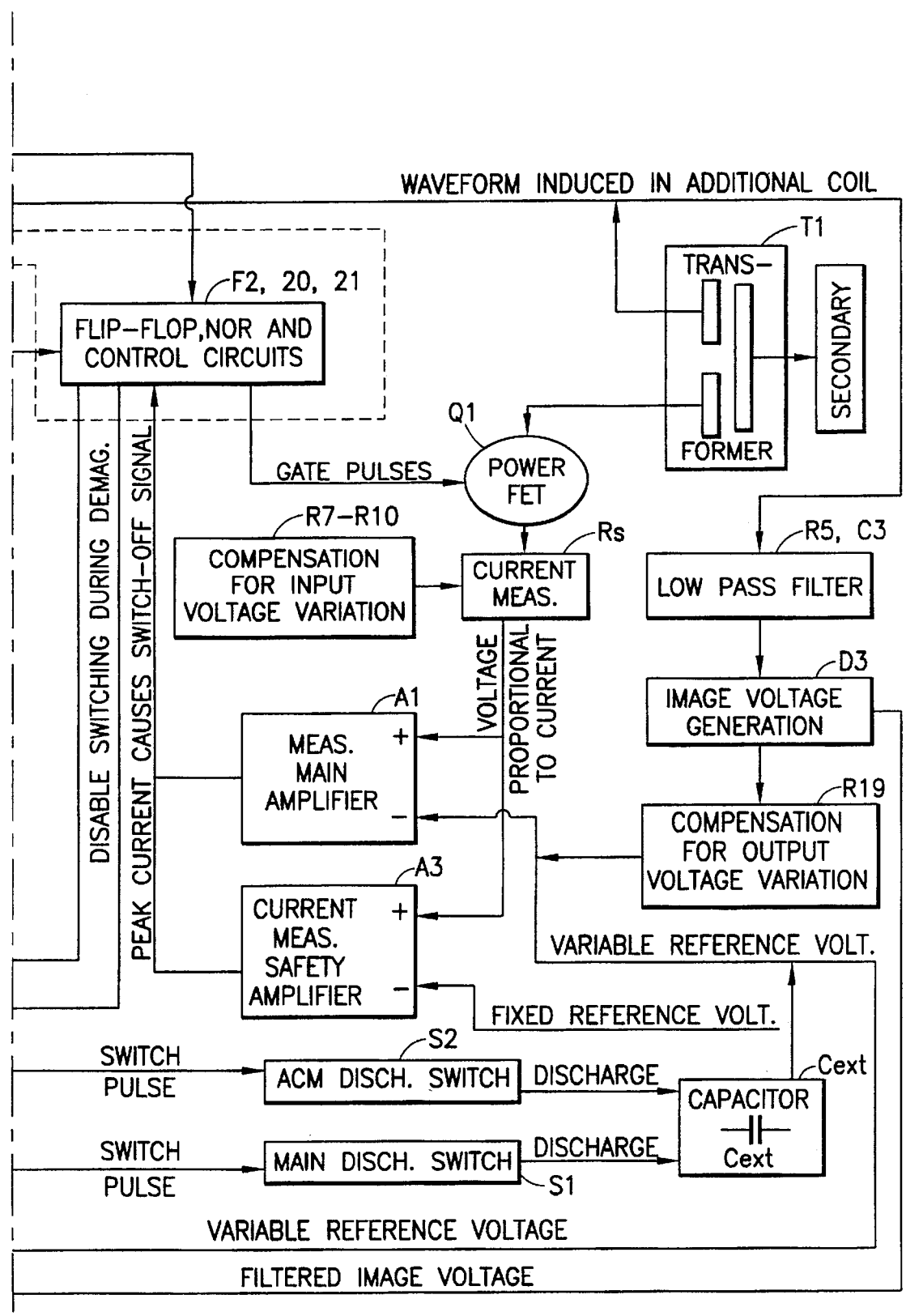

Start of cycle, i.e. switching of FET Q1 ON, occurs at the rising edge of the clock pulse controlling the operation of the system. In the embodiment of FIGS. 7a to 8, the clock pulse is generated by an appropriate block in the PWM circuit 3524. If the power supply were operating in continuous mode, said rising edge of clock pulse would occur during the conduction time $t_D$ of diode D1 in the secondary, which is the same as conduction time $t_S$ of switch S1, presuming that there is no delay between said conduction times. The ACM block 17 used in the circuit according to the invention includes a logic AND gate which in the embodiment of FIG. 7a comprises a PNP transistor pair 18 and resistors R20 to R23 and the inputs of which are said clock pulse controlling the operation of the system and the gate voltage of the switching transistor S1. A positive gate voltage naturally means that the switching transistor S1 is conductive. Said logic AND gate 18, R20–R23 issues an output signal "1", i.e. a positive voltage signal if the clock pulse is positive simultaneously with the positive gate voltage, or the conduction time $t_S$, of the switching transistor S1. The output of said logic AND gate is connected to switch S2, which is advantageously a transistor, as in the embodiment of FIG. 7a, in which case said output is connected so as to serve as its gate voltage. Between the gate of said transistor S2 and the ground potential there is a relatively high resistance so that a positive gate voltage pulse keeps said transistor conductive for a time of sufficient duration.

When said switch S2 is in conductive state, it provides a current path between the terminals of an external capacitor $C_{ext}$. This current path includes advantageously a series resistor, resistor $R_{ACM}$ in FIG. 7a, the resistance value of which provides a means to control the capacitor discharging effect of the current path. If said logic AND gate 18, R20–R23 produces a positive signal, capacitor $C_{ext}$ loses its charge through said current path S2, $R_{ACM}$, wherefore a differential amplifier A1 sends to control circuit F1 a signal which causes FET Q1 to be switched OFF according to the operating principle described above. The structure and operation of the ACM block 17 described above have the advantage that, in a way, the block is "ahead of the time", which means that it starts to limit the ON time of FET Q1 before the switched-mode power supply would enter the continuous mode. This is due to the fact that the signal taken as a second input to the ACM block 17 which represents the conduction time $t_S$ of switch S1 and which is compared to the clock pulse marking the start of the next cycle, is slightly behind the conduction time $t_D$ of diode D1, due to delays in the circuit.

Figure 1:
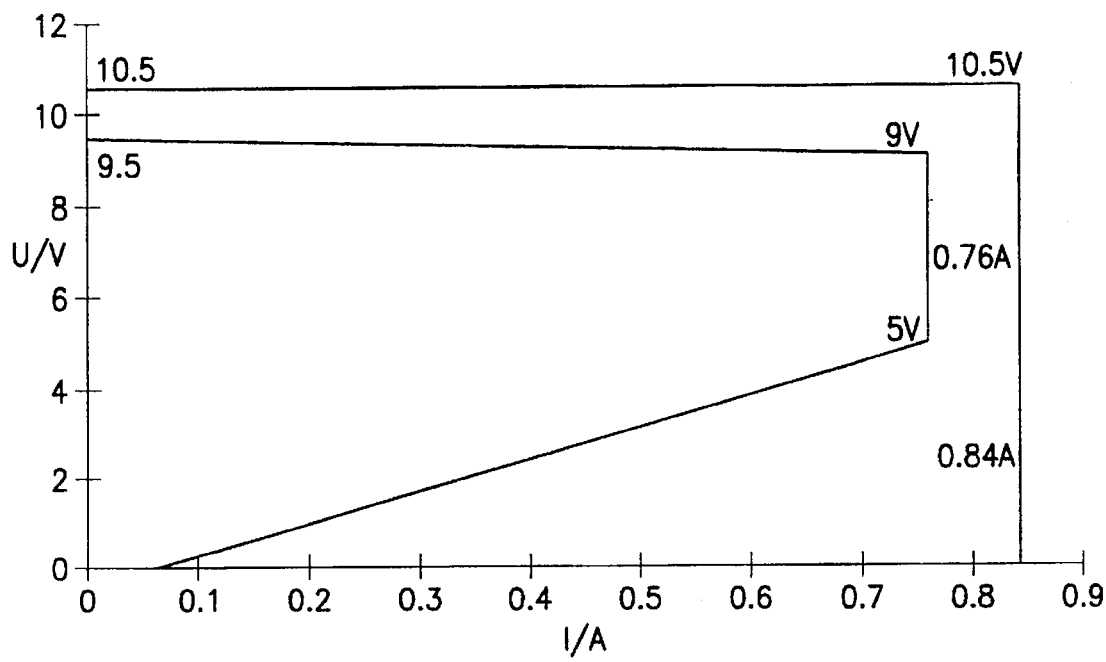
FIG. 1 shows output current and output voltage limits in a typical known charging device designed for charging a series-connected battery comprising six NiCd
Figure 4:
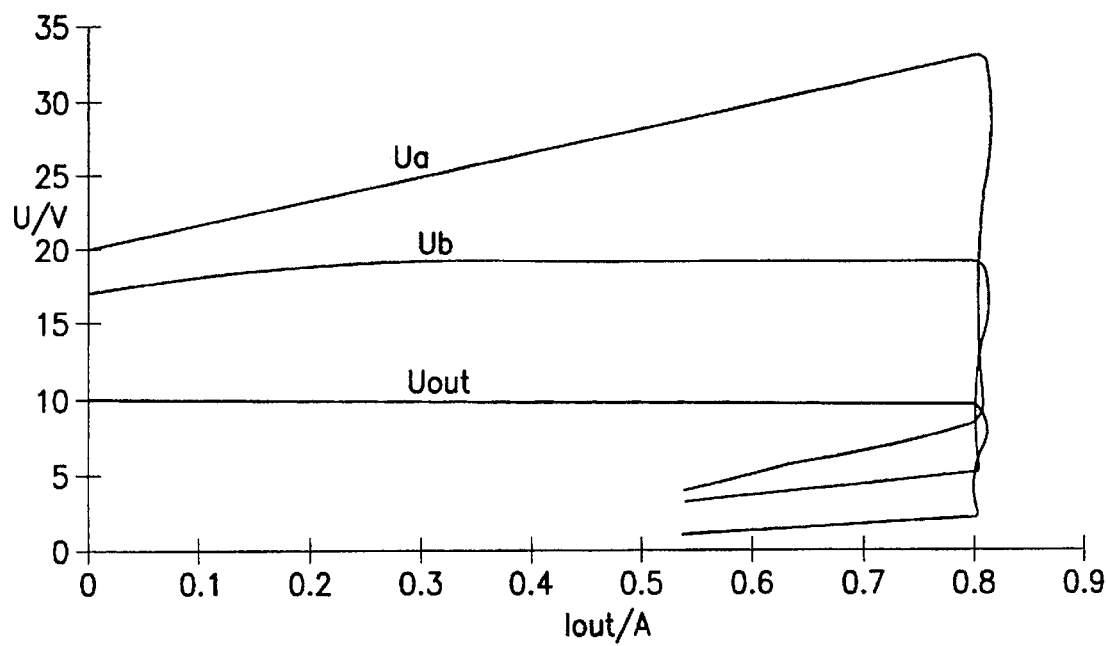

Next it will be discussed the limitation of the output voltage of a switched-mode power supply in a method and circuit according to the invention. The additional winding 13 in transformer T1 is used also for this purpose. In the method and circuit according to the invention, an image voltage is generated for the output voltage $U_{OUT}$ of the switched-mode power supply using a method shown in FIG. 3b, based on the obvious development of a known method described above in connection with the prior art. The image voltage is generated using a low-pass filter, which in the embodiment of FIG. 7a comprises a coupling of resistor R5 and capacitor C3 connected in series and a diode D3 connected to this coupling. The low-pass filter R5, C3 is connected in parallel with the additional winding 13 so as to eliminate the effect of sudden voltage spikes induced in the additional winding. The anode of diode D3 is connected in the middle of said low-pass filter, between resistor R5 and capacitor C3, and its cathode is connected via capacitor C4 to the ground potential. So, the cathode of diode D3, marked as B, shows an image voltage $U_b$, the behaviour of which as a function of the output current $I_{OUT}$ of the switched-mode power supply is shown graphically in FIG. 4.

Figure 3A:
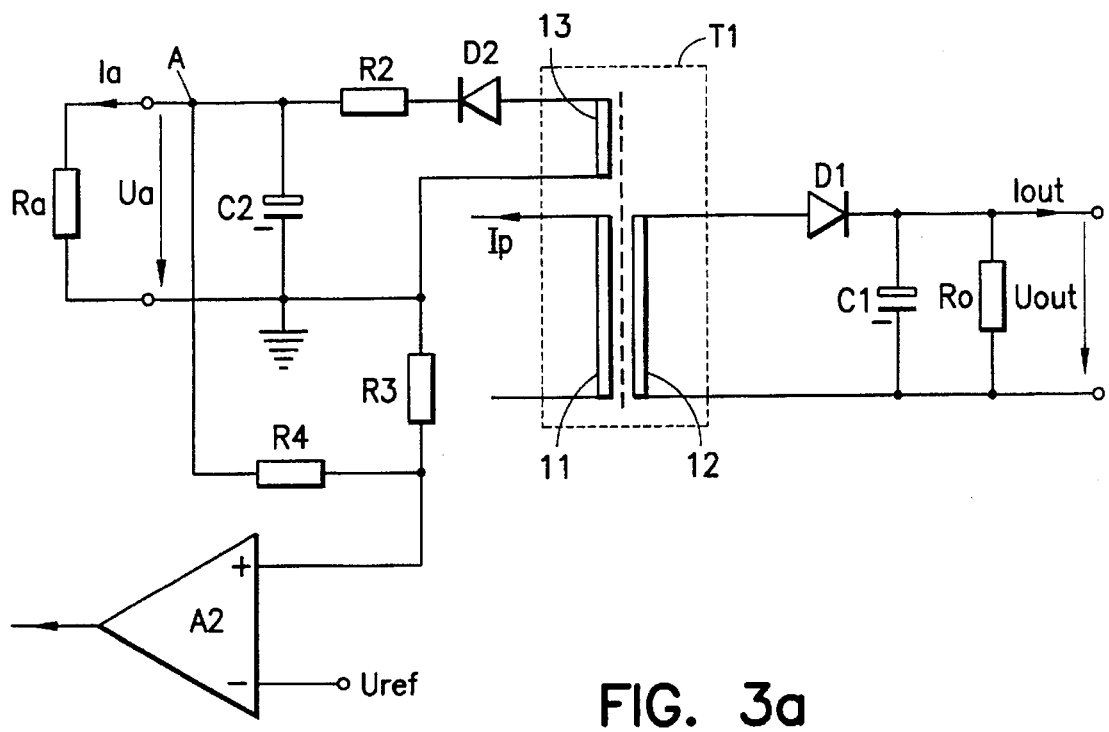
FIG. 3a is a circuit diagram of a known voltage limiting circuit of a switched-mode power supply.
Figure 3B:
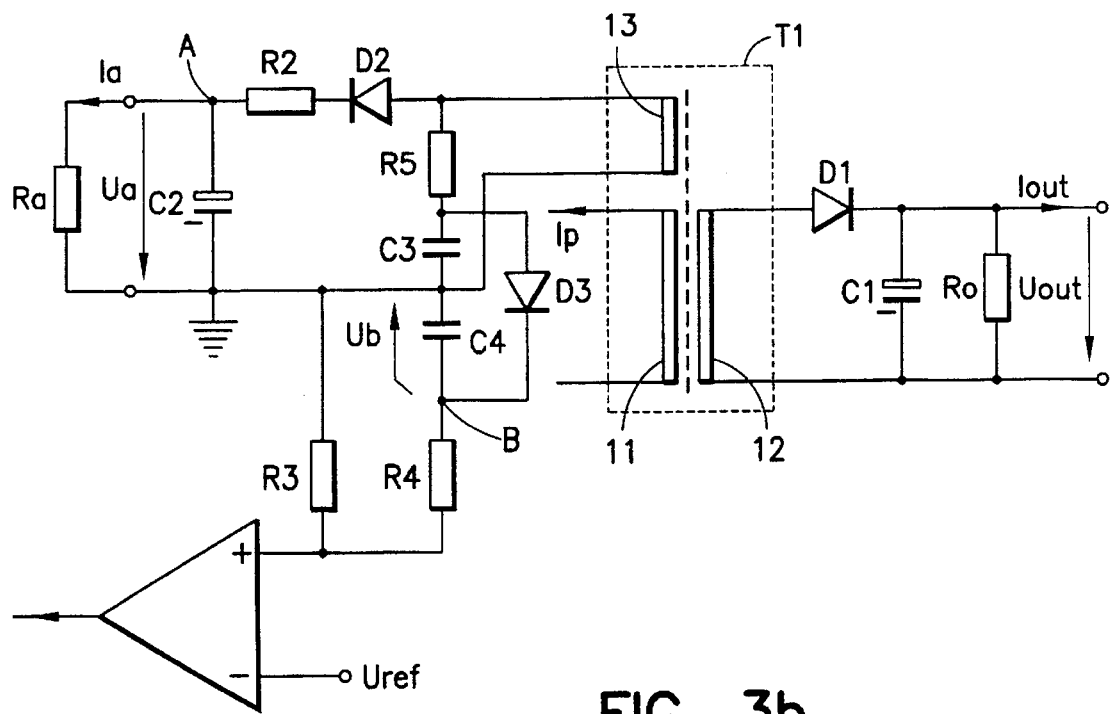
FIG. 3b is a modified version of the coupling shown in FIG. 3a, FIG. 4 graphically illustrates three measured voltages $U_a$, $U_b$ and $U_{OUT}$ as a function of the output current $I_{OUT}$ in the switched-mode power supply according to the invention, FIG. 5 graphically illustrates a measured and calculated reference voltage $U_{ext}$ as a function of the output current $I_{OUT}$ in the switched-mode power supply according to the invention, FIG. 6 graphically illustrates two measured voltages $U_{OUT}$ and $U_{ext}$ as a function of the output current $I_{OUT}$ in the switched-mode power supply according to the invention.

However, in the method and circuit according to the invention, the image voltage $U_b$ is not taken directly to the differential amplifier controlling the operation of the PWM circuit, as described above in connection with the discussion about the prior art and the obvious development related to it, referring to FIG. 3b. According to the invention, a linear combination is produced of said image voltage $U_b$ and the aforementioned first reference voltage Uext since these two voltages undergo a change that is substantially similar but of the opposite sign, as a function of the output current $I_{OUT}$ of the switched-mode power supply. In the embodiment of FIG. 7a, said linear combination is produced using a two-input resistor network comprising resistors R11 to R14. Resistors R11 and R12 constitute a series connection which is the series resistance of the first input and through which the image voltage $U_b$ is connected to said resistor network. Resistor R13 is the series resistance of the second input through which said first reference voltage $U_{ext}$ is connected to said resistor network. Ends of the series resistances of said first input and second input are connected together at point C and resistor R14 is connected to the ground potential through this point. Voltage $U_1$ at point C is a linear combination of voltages $U_{ext}$ and $U_b$, or $$U_1 = mU_b + nU_{ext} \tag{10}$$

where constants m and n depend on the resistances of resistors R11 to R14. The embodiment of FIG. 7a also includes an amplifier A5, the amplification of which is advantageously 1 and the purpose of which is to prevent the voltage signals from being connected back from point C to the current regulating system which was described above and which is based on the voltage across the external capacitor $C_{ext}$. Voltage $U_1$ is taken to a differential amplifier A4 which controls the operation of the PWM circuit and which in the embodiment of FIG. 7a is included in PWM circuit 3524. Amplifier A4 compares voltage $U_1$ to a third reference voltage $U_{ref3}$ which is generated by a voltage divider comprising resistors R15 and R16. PWM circuit 3524 uses the output signal of said differential amplifier to control the pulse ratio when generating FET Q1 switching pulses taken to control circuit F1. This is normal operation of a known, commercially available PWM circuit and therefore it is not described in further detail here.

In addition to the parts described above, the embodiment of the circuit according to the invention, illustrated in FIG. 7a, includes other parts which are known but the operation of which is related to the stabilization of the output characteristics of the switched-mode power supply and which therefore will be described below. To limit said first reference voltage $U_{ext}$ below a certain maximum value, a limiter circuit is used comprising a PNP transistor Q2 and resistors R17 and R18. Said resistors constitute a voltage dividing coupling between the +5 V potential and ground potential, and there is a connection from a point between them to the base of said transistor Q2. The emitter of transistor Q2 is connected to the positive side of the external capacitor $C_{ext}$, and its collector is connected to the ground potential.

The embodiment of FIG. 7a also includes a relatively high-resistance compensating coupling R19 connected between point B (cathode of the image voltage rectifying diode, or the point at which image voltage $U_b$ appears) and the positive side of the external capacitor $C_{ext}$. In the mathematical discussion of the first reference voltage $U_{ext}$ above it was implied that there is no delay in the circuit between diode D1 of the secondary and the switching operation of switch S1. As a matter of fact, there is always a small delay between them, and therefore the conduction time $t_S$ of switch S1 is a little too long with a high output voltage of the switched-mode power supply, which results in that the output current $I_{OUT}$ increases when the output voltage $U_{OUT}$ drops. If a voltage proportional to the output voltage $U_{OUT}$ is used to produce a small additional charge in capacitor $C_{ext}$, it is possible to compensate for the capacitor overdischarge which is caused by the excessive conduction time of switch S1 with a high output voltage $U_{OUT}$. The image voltage $U_b$ is suitably proportional to the output voltage, so by arranging a relatively high-resistance compensating coupling from it to the capacitor $C_{ext}$ in the manner described above a desired stabilizing effect is achieved.

Figure 10:
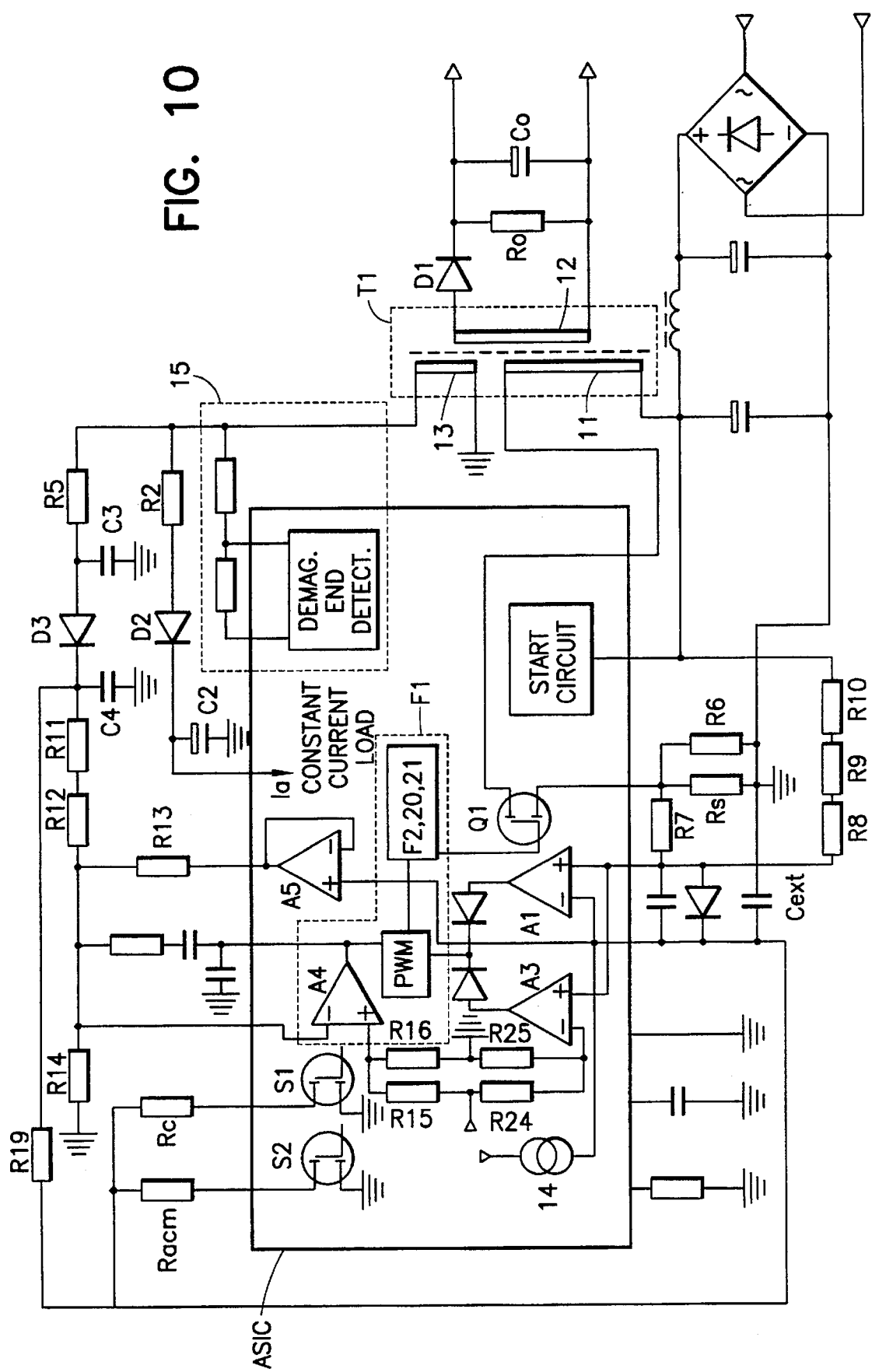
FIG. 10 is a circuit diagram of an embodiment of the invention where most of the necessary components are integrated in a single IC.

In above descriptions and especially in FIG. 7a the circuit according to the invention was regarded as a whole constituted by discrete components. However, there is a strong tendency in modern electronic equipment towards integration, with all applicable components realized within one integrated circuit, or IC. FIG. 10 shows an embodiment of the present invention in which most of the components and blocks that were shown discrete in FIGS. 7a and 8 are realized as one application specific integrated circuit, or ASIC. For the sake of clarity, some of the lines describing connections have been left out in FIG. 10 and many of the component groups are shown only as functional blocks, but in principle the structure and operation of the coupling is the same as in the embodiment of FIG. 7a. In FIG. 10, components that are not included in the ASIC are either too big to fit in or intended to be easily replaceable so that the circuit characteristics can be altered according to the use. The embodiment shown in FIG. 10 only serves illustrative purposes and is by no means the only possible ASIC implementation of the method and circuit according to the invention. It is obvious to a person skilled in the art that many different ASIC applications can be realized within the scope of the claims set forth below.

Above it was described the use of the method and circuit according to the invention in a situation in which the transformer of the switched-mode power supply comprises three windings. However, the method and circuit according to the invention can with minor modifications be implemented using a two-coil transformer. Then the demagnetization information and generation of image voltage occur in a circuit connected directly in parallel with the primary winding. The two-coil solution requires certain safety measures to prevent the high primary power from being directly connected to the demagnetization information and image voltage circuits dimensioned for small signals. In an ASIC circuit this means that inside the circuit there must be a greater number of relatively wide isolation zones, which require space, and therefore the embodiment discussed above is considered better for the time being. In any case, it is possible to apply the method according to the invention to a switched-mode power supply employing a two-coil transformer.

Next it will be discussed only the method according to the invention to control the output characteristics of a switched-mode power supply with reference to FIG. 9 and without directly referring to any particular physical embodiment. The method comprises several operations applied simultaneously, so it is impossible to present an accurate temporal order.

Figure 9:
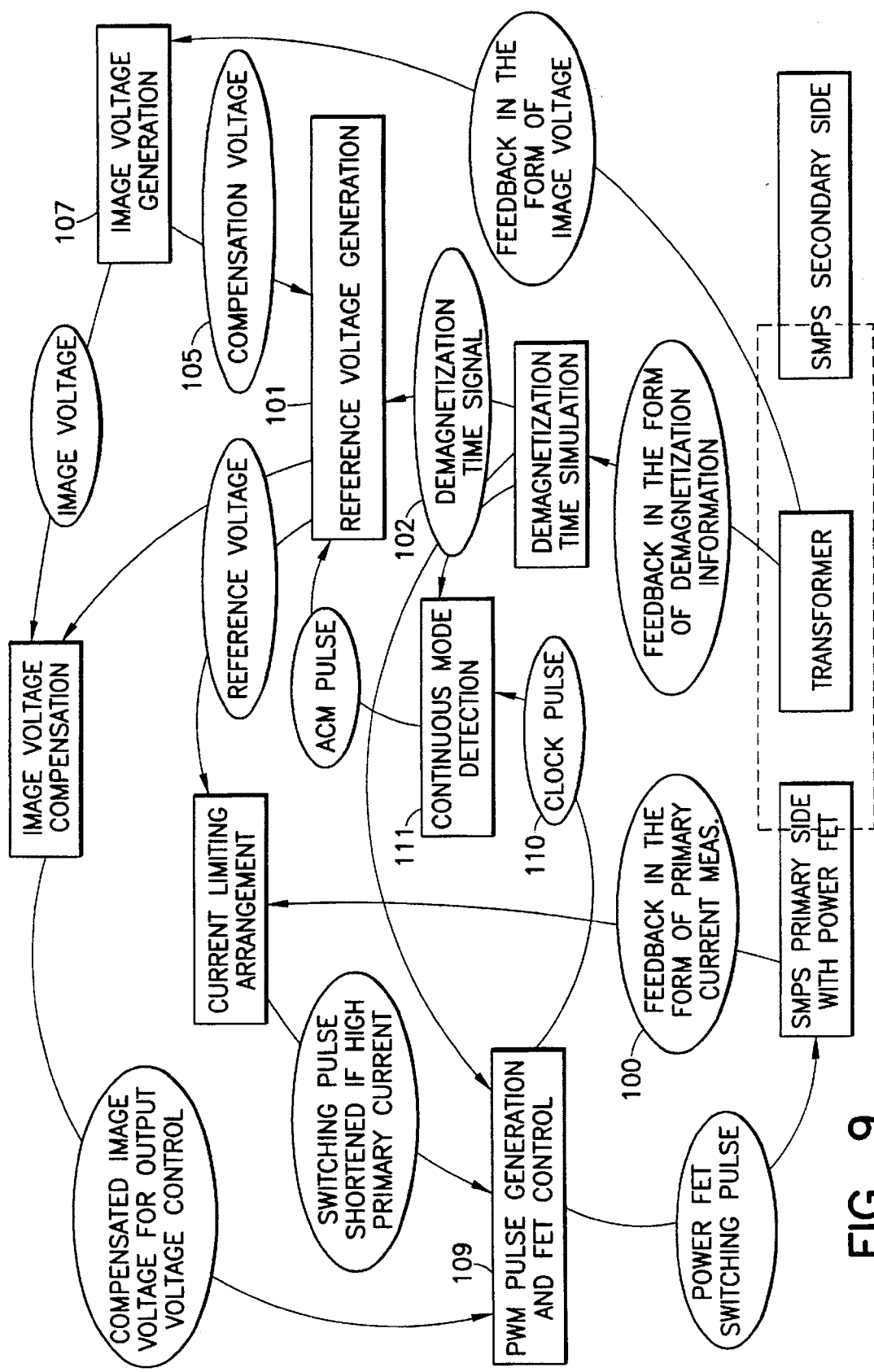

The method according to the invention, illustrated by FIG. 9, realizes all the measures described above in connection with the descriptions of the physical embodiments. Rectangular blocks depict functional steps of the method and designations in oval frames clarify the type and meaning of information transferred in the form of signals or pulses or in other ways.

In the method according to the invention, output current limiting includes at least the following steps:

current flowing through the primary current switching element, or power FET, is measured 100 and the measurement result is converted to a voltage value, a first reference voltage is generated 101 on the basis of information 102 about the beginning and end of demagnetization, said voltage value representing the current through the switching element is compared 103 to said first reference voltage, and the result from said comparison is used for dimensioning the primary current switch control pulses such that if said voltage value representing the current through the switching element indicates that the current exceeds a certain limit value, the control pulses will be shortened 104 in order to decrease the current.

In addition, output current limiting may include the following steps:

said first reference voltage is compensated for with a small compensating signal 105 the size of which is proportional to an image voltage generated from the secondary voltage of the switched-mode power supply, said first reference voltage is further compensated for by altering its value so that if the simultaneousness of the clock pulse 110 and demagnetization time signal 102 indicates 111 that the switched-mode power supply is about to enter continuous mode operation, the value of the first reference voltage is changed 106 such that it causes the shortening of the switching pulses of the switching element, said first reference voltage is further compensated for with a limiter circuit which limits it below a certain maximum value (not shown in FIG. 9), and said voltage value representing the current through the switching element is compared to a fixed second reference voltage (not shown in FIG. 9) and the result from the comparison is used in the same way as the result from said first comparison.

In the method according to the invention, the switched-mode power supply output voltage control includes at least the following steps:

an image voltage is generated 107 that corresponds to the voltage of the secondary winding in the switched-mode power supply, a combination is produced 108 of said image voltage and the first reference voltage mentioned above, and a pulse-width-modulated pulse train is produced 109 on the basis of said combination in order to switch the primary current switching element.

In the method according to the invention, the switched-mode power supply output voltage control may further include the following steps:

said image voltage is compensated for by removing from it unwanted phenomena such as sudden voltage spikes, and said linear combination is compared to a third reference voltage in order to produce 109 a pulse-width-modulated pulse train.

Figure 6:
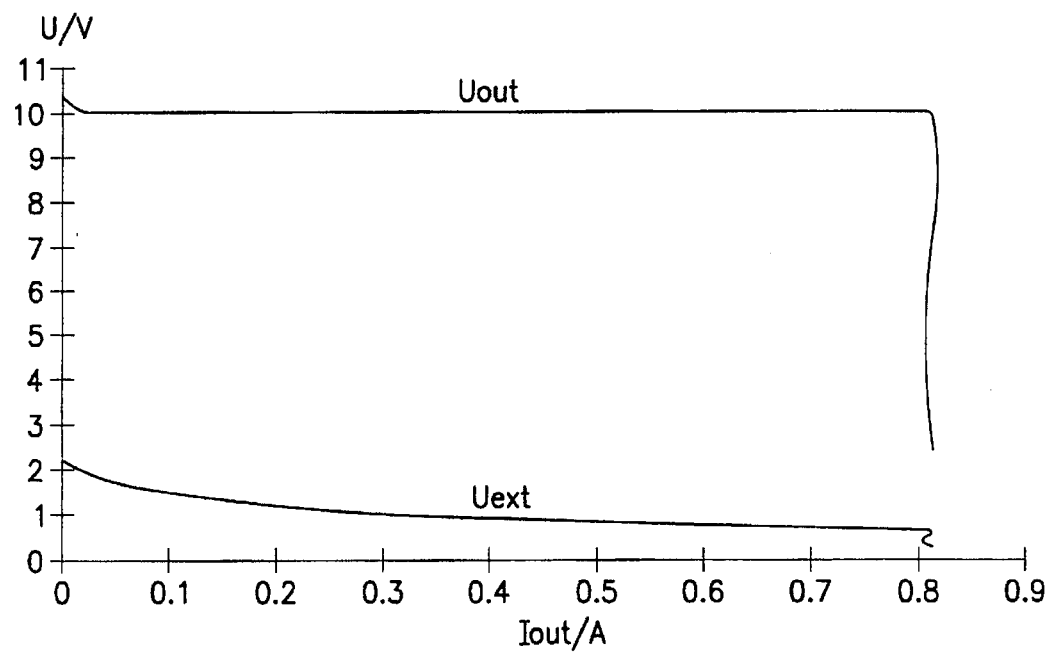

The method and circuit according to the invention are suitable for producing a very stable switched-mode power supply output voltage $U_{OUT}$ as a function of the output current $I_{OUT}$, as can be seen from FIG. 6, which for the sake of comparison also shows the first reference voltage $U_{ext}$ across capacitor $C_{ext}$. The solution is very simple which means operational reliability, small manufacturing costs and good throughput in mass production. The method and circuit according to the invention eliminate the need for sandwich-type transformers or otherwise complex inductive elements, and the circuit has no need for opto-isolated connections between the primary and the secondary.

I claim:

1. A circuit to control the output current and output voltage in a switched-mode power supply that comprises a transformer (T1) equipped with primary and secondary windings (11, 12, 13) through which power is transferred from the primary to the secondary, and a first switching element (Q1) on the primary side to interrupt the primary current ($I_p$) flowing through the primary winding (11) of said transformer, which circuit comprises on the primary side a control circuit (F1) to regulate the output voltage of the power supply by means of pulse width modulation by adjusting the pulse ratio of the switching pulses of said first switching element (Q1), means (14, S1, $R_s$, $C_{ext}$) for producing a first reference voltage ($U_{ext}$), and means (D2, R2, C2, $I_a$, R5, D3, C3, C4) for producing a first voltage signal ($U_b$), characterized in that it further comprises on the primary side means (R11–R14) for producing a combination of said first reference voltage ($U_{ext}$) and first voltage signal ($U_b$) and for taking said combination to said control circuit (F1) in order to produce said switching pulses.

2. The circuit of claim 1, characterized in that to produce said combination it comprises a two-input resistor network (R11–R14) wherein said first reference voltage ($U_{ext}$) is substantially connected to the first input and said first voltage signal ($U_b$) is substantially connected to the second input.

3. The circuit of claim 1, characterized in that it comprises means ($R_s$; R7–R10) for measuring the current flowing through said first switching element (Q1) and for converting it to a second voltage signal.

4. The circuit of claim 3, characterized in that it comprises means (A1) for comparing said second voltage signal to said first reference voltage ($U_{ext}$) and for taking the signal representing the result from said comparison to said control circuit (F1).

5. The circuit of claim 1, characterized in that it comprises means for producing an image voltage which represents the voltage of the secondary winding in said transformer (T1) and which substantially is said first voltage signal ($U_b$).

6. The circuit of claim 5, characterized in that in addition to a primary winding (11) and secondary winding (12) said transformer (T1) includes an additional winding (13) to produce said image voltage and said first voltage signal ($U_b$).

7. The circuit of claim 1, characterized in that it comprises means (17) for preventing continuous mode operation of the switched-mode power supply.

8. The circuit of claim 7, characterized in that it comprises on the secondary side a secondary diode (D1) and that said means (17) for preventing continuous mode operation of the switched-mode power supply comprises a comparison element (18) for comparing the signal, which indicates conduction of said secondary diode (D1), with the clock signal controlling the operation of said circuit.

9. The circuit of claim 1, characterized in that it comprises means (R19) for conducting a compensating signal between said first voltage signal ($U_b$) and said first reference voltage ($U_{ext}$).

10. The circuit of claim 1, characterized in that it comprises means (R24, R25, A3) for producing a second reference voltage ($U_{ref2}$) and for comparing said second voltage signal to said second reference voltage ($U_{ref2}$) and for taking the signal representing the result from said comparison to said control circuit (F1).

11. The circuit of claim 1, characterized in that it comprises means (R7–R10) for eliminating disturbances caused by variations in the input voltage from the result of the measurement of the current ($I_p$) flowing through said first switching element (Q1).

12. The circuit of claim 1, characterized in that it comprises means (A5) for preventing a back coupling from the part where said combination is generated to the part where said first reference voltage ($U_{ext}$) is generated.

13. The circuit of claim 1, characterized in that it comprises means (Q2, R17, R18) for limiting said first reference voltage ($U_{ext}$) below a predetermined maximum value.

14. A method for controlling the output current and output voltage of a switched-mode power supply in which power is transferred by means of a transformer from the primary to the secondary, a switching element is switched on the primary side, and the output voltage is controlled by means of changing the pulse ratio of the switching pulses of said switching element, and wherein, on the primary side of the switched-mode power supply, a first reference voltage is produced and a first voltage signal is produced, characterized in that also on the primary side a combination is produced of said first voltage signal and said first reference voltage and on the basis of said combination, said switching pulses are generated in order to switch the primary current switching element.

15. The method of claim 14, characterized in that said combination is compared to a third reference voltage in order to produce said switching pulses.

16. The method of claim 14, characterized in that said combination is a linear combination.

17. The method of claim 14, characterized in that in it the primary current of the switched-mode power supply is measured, the measurement result is compared to said first reference voltage, and the result from said comparison is used for controlling said switching element.

18. The method of claim 17, characterized in that when said comparison indicates that said primary current is greater than a predetermined maximum value, the switching pulses of said switching element are shortened.

19. The method of claim 18, characterized in that the switching pulses are shortened with different components than those used to produce a pulse-width-modulated switching pulse train.

20. The method of claim 14, characterized in that in it information is produced about the start and end times of demagnetization of the transformer in the switched-mode power supply and said first voltage signal is produced on the basis of said information and said first voltage signal represents the secondary voltage of the switched-mode power supply transformer.

21. The method of claim 14, characterized in that if the switched-mode power supply is about to enter continuous mode operation, the value of said first reference voltage is changed such that it causes the switching pulses of the switching element to be shortened.

22. The method of claim 14, characterized in that between the generation of said first voltage signal and the generation of said combination said first voltage signal is shaped in order to produce better correspondence between it and said secondary voltage.

23. The method of claim 22, characterized in that said shaping is realized by low-pass filtering said first voltage signal.

24. The method of claim 20, characterized in that the information about the end of transformer demagnetization is produced by comparing the voltage across one winding of the transformer to a substantially constant voltage.

* * * * *